Figure 1:
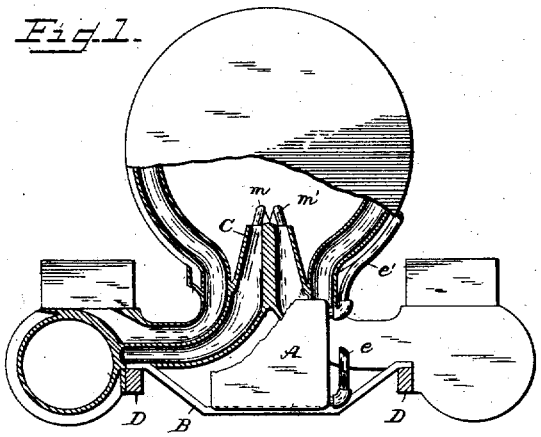

E. GOSS.

Assignor by direct and mesne assignments, to the FEED WATER HEATER COMPANY.

FEED WATER HEATER.

No. 11,090. Reissued June 24, 1890.

Edward Goss

Witnesses
Edwin L. Bradford
Charles J. Stockman

Inventor
Chas. E. Barbar
By his Attorney in fact

THE NORRIS PETERS CO., PHOTO-LITHO., WASHINGTON, D. C.

UNITED STATES PATENT OFFICE.

EDWARD GOSS, OF ST. JOHNSBURY, VERMONT, ASSIGNOR, BY DIRECT AND MESNE ASSIGNMENTS, TO THE FEED WATER HEATER COMPANY, OF SAME PLACE.

FEED-WATER HEATER.

SPECIFICATION forming part of Reissued Letters Patent No. 11,090, dated June 24, 1890.

Original No. 355,989, dated January 11, 1887. Application for reissue filed November 18, 1887. Serial No. 255,456.

*To all whom it may concern:*

Be it known that I, EDWARD GOSS, of St. Johnsbury, Caledonia county, State of Vermont, have invented an Improvement in Feed-Water Heaters, of which the following description, in connection with the accompanying drawings, is a specification, like letters on the drawings representing like parts.

My invention relates to an apparatus for heating the feed-water for boilers by means of the exhaust-steam, being especially intended for use in connection with a locomotive-boiler, substantially as shown in Letters Patent No. 230,190, granted to Chas. H. Magoon, July 20, 1880.

The present invention consists, mainly, in novel details of construction of the feed-water heater, which may be connected with the frame of the locomotive and with the water and exhaust-steam pipes in substantially the same way as the heater shown in patent to Magoon referred to.

The heater forming the subject of the present invention consists, essentially, of an outer shell or case which receives a portion of the exhaust-steam of the engine, and which is provided at one end with a cast-metal head having double walls provided with a series of transverse partitions, by which it is divided into a series of separate compartments or chambers, lying one above the other. The said head has screwed into it a series of pipes, which extend through the case or shell of the heater, and each of which has its mouth extending across one of the horizontal partitions in the head of the case, so that the said pipe forms a connection or means of communication between the chambers in the head separated by the said partition. Each of the said pipes is provided with a longitudinal partition, which, when the pipe is screwed into place, coincides with the partitions in the head of the case, the partitions in the pipes extending nearly to the other end thereof, where the said pipes are closed. By this arrangement the feed-water, being forced into the lowest chamber or compartment in the head of the case, will pass longitudinally through the lowermost series of pipes below the partitions thereof, and will then return through the upper part of the said pipes into the next chamber or compartment of the head of the case, from which they will pass down and back through the second tier of pipes into the next compartment above, and so on until it reaches the uppermost compartment in the head of the case, from which it is delivered to the boiler after having been thoroughly exposed to the exhaust-steam in the case surrounding the pipes. The head of the case near the closed ends of the pipes is shown as provided with supports for the said pipes, which are thus fully supported at both ends and prevented from bending or displacement by the jarring to which the heater is subjected.

Figure 4:
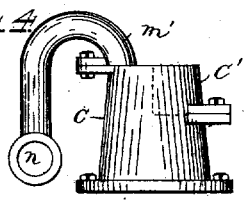
Figure 5:
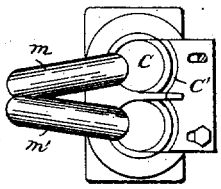
Figure 2:
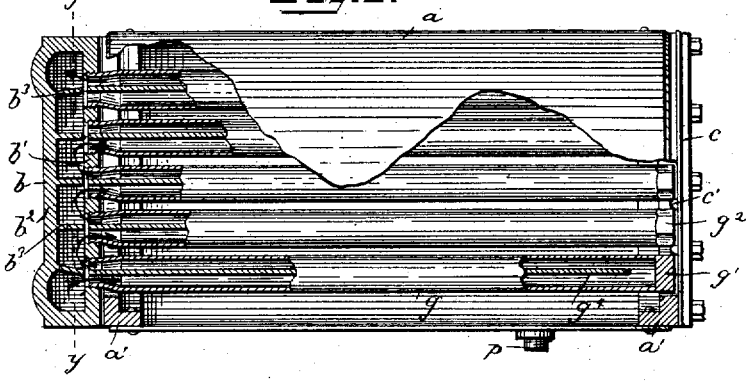
Figure 3:
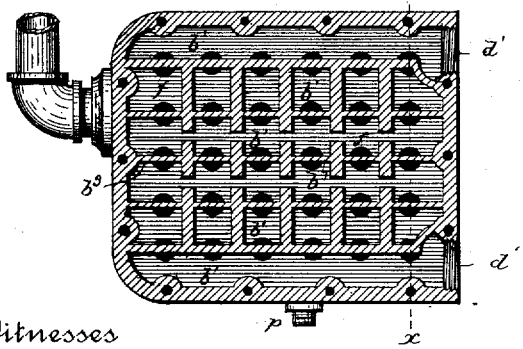
Figure 6:
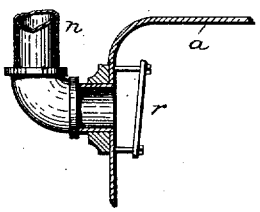

Figure 1 is a sectional view of a portion of a locomotive boiler and cylinders and framework, showing the method of attaching the heater to the frame-work; Fig. 2, a side elevation, partly in section, on line $x\ x$, Fig. 3, of the heater detached, on a larger scale; Fig. 3, a vertical section on line $y\ y$, Fig. 2, of the head of the heater; Figs. 4 and 5, details of the passages by which the steam is taken from the exhaust-pipes of the engine to the heater-case; and Fig. 6, a sectional detail of the junction, showing the said passage with the heater-case.

The heater consists, essentially, of an outer shell or case $a$, which may be a substantially rectangular box of sheet metal, provided at its ends with flanges $a'$, to receive the heads or bonnets $b\ c$.

The head $b$ is composed of cast metal having two walls $b'\ b^2$ and a series of horizontal partitions $b^3$ dividing the space between the said walls into a series of horizontal compartments, the lowermost and uppermost of which are provided with threaded openings $d\ d'$, to which the water-pipes $e\ e'$, Fig. 1, are connected, the former receiving the water from the pump or forcing apparatus and the latter conveying it from the heater to the boiler. The inner wall $b'$ of the head $b$, next the interior of the case, is provided with a series of openings $f$, (best shown in Fig. 3,) opposite and extending over the partitions $b^3$, as shown, into which openings are screwed a series of tiers of circulating-pipes $g$, (see Fig. 2,) the opposite ends of which are closed, as shown at $g'$, and are properly shaped at the outside to receive a wrench, as shown at $g^2$, Fig. 2, by which they may be screwed into the openings in the wall $b'$ of the head $b$. Each of the pipes $g$ is provided with a series of horizontal partitions $g^4$, extending longitudinally through it from its mouth to within a short distance of the closed end $g'$, as clearly shown in Fig. 2. The said partitions when the pipes are screwed in place coincide with the partitions $b^3$, as shown in Fig. 2, so that water forced into one of the horizontal compartments of the head $b$ can pass through the lower part of the opening $f$ into the portion of the pipe $g$ below the partition $g^4$, and then, after having passed the entire length of the pipe below the partition and passed back above the partition, can enter through the other half of the same opening $f$ to the next compartment of the head $b$ above the one from which it entered the pipe $g$. Thus, if the water is forced from the pipe $e$ into the lower compartment of the head $b$ it cannot reach the upper compartment in the said head and be delivered to the pipe $e'$ until after having passed back and forth through the entire length of the pipes of each tier of pipes $g$, and having thus been thoroughly exposed to the heat of steam in the case $a$ outside the said pipes, the direction of its circulation being clearly shown by the arrows, Fig. 2.

The opposite head or bonnet $c$ of the case $a$ is provided with supports, (shown as inwardly-projecting ribs $c'$,) for the ends of the pipes $g$, which are thus securely held at both ends and prevented from jarring or displacement. The exhaust-steam may be taken from both sides of the exhaust-cone C, Fig. 1, which is shown in section beyond the heater A, as seen looking toward the front of the locomotive, the said heater being supported on cross-pieces or hangers B from the main side frames D of the locomotive slightly at the rear of the cylinders of the engine.

The pipes $m$ $m'$ lead from the tops of the cones and receive steam from the two cylinders alternately, and preferably unite at an acute angle, as indicated in Fig. 5, in a single piece $n$, leading into the side of the case $a$, as shown in Fig. 3. By this arrangement the exhaust-steam forced into either of the pipes $m$ $m'$ will, on its arrival at their junction with the pipe $n$, tend, by its velocity, to continue on through the pipe $n$ into the case $a$, instead of passing back in the other pipe toward the exhaust-cone.

A baffle-plate or deflector $r$ is preferably placed opposite the mouth of the exhaust-steam-inlet pipe $m$, as shown in Fig. 4, to insure a more uniform distribution of the steam throughout the interior of the case. The case $a$ is provided with an outlet $p$ for the escape of water of condensation.

The exhaust-cone C may be provided with a laterally-adjustable piece C', Figs. 4 and 5, opposite the mouths of the pipes $m$ $m'$, by means of which adjusting-piece the size of the orifice of the exhaust-cone may be varied so as to produce the desired velocity of the exhaust-steam for forcing a portion of the same into the heater-case and causing the remainder to perform its usual function of stimulating the draft.

I claim—

1. The combination, with the flanged casing, the head $b$, having a double wall and a series of horizontal partitions forming compartments, the water-pipes $e$ $e$, and the head $c$, of the pipes $g$, provided with horizontal partitions $g^4$, which connect with the horizontal partitions of the head $b$, as shown and described.

2. The combination, with the exhaust-cones, of a locomotive and pipes $m$ $m'$, leading from the tops thereof and receiving steam from two cylinders alternately, of a feed-pipe in communication with a feed-water-heater case having a series of water-circulating pipes, substantially as and for the purposes described.

3. The case having a head $b$, provided with a series of horizontal partitions forming separate compartments; and head $c$, combined with a series of pipes closed at one end and having their opening opposite end connected with the head $b$, and communicating with two of the compartments therein, the said pipes being provided with partitions coinciding with those of the head $b$, extending to within a short distance of the closed ends of the pipes, substantially as described.

4. The combination of the exhaust-cone of the locomotive and pipes $m$ $m'$, leading therefrom, with an adjustable piece governing the orifice of the exhaust-cone, and a feed-water heater consisting of exhaust connected with said pipes $m$ $m'$, and a series of water-circulating pipes in the said case, substantially as described.

In testimony whereof I have signed my name to this specification in the presence of two subscribing witnesses.

EDWARD GOSS.

Witnesses:
J. L. BACON,
F. G. CARTER.